Jan. 12, 1971          H. EINSTEIN          3,554,655

SMOKE DENSITY MEASURING DEVICE INCLUDING MEANS TO PERIODICALLY
BLOCK A LIGHT FROM A PORTION OF THE FIELD OF VIEW

Filed Jan. 27, 1969          4 Sheets-Sheet 1

INVENTOR
HARRY EINSTEIN

BY

LERNER & BEHR
ATTORNEYS

Jan. 12, 1971 H. EINSTEIN 3,554,655
SMOKE DENSITY MEASURING DEVICE INCLUDING MEANS TO PERIODICALLY
BLOCK A LIGHT FROM A PORTION OF THE FIELD OF VIEW
Filed Jan. 27, 1969 4 Sheets-Sheet 2

INVENTOR
HARRY EINSTEIN

BY

LERNER & BEHR
ATTORNEYS

Jan. 12, 1971  H. EINSTEIN  3,554,655
SMOKE DENSITY MEASURING DEVICE INCLUDING MEANS TO PERIODICALLY
BLOCK A LIGHT FROM A PORTION OF THE FIELD OF VIEW
Filed Jan. 27, 1969  4 Sheets-Sheet 4

INVENTOR
HARRY EINSTEIN
BY

LERNER & BEHR
ATTORNEYS

United States Patent Office 3,554,655
Patented Jan. 12, 1971

3,554,655
SMOKE DENSITY MEASURING DEVICE INCLUDING MEANS TO PERIODICALLY BLOCK A LIGHT FROM A PORTION OF THE FIELD OF VIEW
Harry Einstein, Springfield, N.J. (% Nebetco Engineering, 1100 Chandler Ave., Roselle, N.J. 07203)
Filed Jan. 27, 1969, Ser. No. 794,170
Int. Cl. G01n 21/12, 21/20
U.S. Cl. 356—204
18 Claims

ABSTRACT OF THE DISCLOSURE

A device for measuring the density of smoke suitable for measuring the density of either white smoker or black smoke. The device comprises one or more shutters, such as rotating discs, so placed as to partially periodically interfere with the field of vision of a viewing tube through which the smoke under examination is viewed. The density of the smoke is measured by comparing the appearance of the smoke with the appearance of ambient air through the rotating shutter in the field of vision. The device may be used for white smoke as well as black smoke density measurement by reflecting light off the shutter as it is rotating.

FIELD OF THE INVENTION

Smoke density measuring devices.

DESCRIPTION OF THE PRIOR ART

Heretofore the density of smoke has been measured by viewing the smoke under examination through glass, plastic, or screen filters of varying densities. These prior art devices generally require the use of optical lenses and/or prisms and have been found to suffer from the serious practical disadvantage that accurate measurements of black smoke density below Ringlemann 2 have not been possible. In view of present and projected anti-pollution codes which specify a maximum density for smoke emission of Ringlemann 1, the accurate measurement of smoke density at the lower end of the Ringlemann scale becomes of great practical importance. Furthermore, there are no known devices which can give accurate measurements of the density of white smoke.

SUMMARY OF THE INVENTION

In the device and modifications thereof of the present invention a rotating shutter, suitably a rotating segmented disc is disposed so as to obscure a portion of the field of vision of a viewing tube directed at the ambient air adjacent the smoke whose density is to be measured. The shutter is rapidly opened and closed across that portion of the field of view to be obscured, where the shutter is a segmented disc, the rate of rotation of the disc is high enough so that the human eye cannot readily distinguish between the solid portions of the disc and the areas from which the segments have been removed. As a matter of practice however, it has been found desirable that the speed of rotation be sufficiently low to permit a slight fluttering to be observed since smoke itself is not usually of entirely uniform density and such fluttering has been found to aid in a more accurate determination of its density. It will be readily seen that where the segmented disc has only a small segment removed, it will, during rotation, present to the viewer a darker field of vision than that presented by a disc wherein a greater segment has been removed.

In use the viewer looks at a source of black smoke against a light background such as the sky, bringing the shuttered portion of the field as close to the smoke as possible while still viewing the ambient; and then comparing this shuttered view of the ambient to the actual smoke to determine whether the smoke is darker than the shuttered ambient. If so, the smoke density has a higher Ringlemann value than the reference shutter.

Modifications of the present invention provide for the interposition either simultaneously or sequentially of one or more discs of different degrees of segmentation in order to provide a field of comparison for the viewer. Other modifications of the invention provide in the device a plurality of discs of different degrees of segmentation and means for viewing these discs in rotation, either singularly or in pairs in the field of view.

It will be understood that when white smoke is viewed against a dark background, compensation must be made in the device for the appearance of the smoke due to reflectance of light from the particles forming the smoke. There are therefore provided in another modification of the present invention, illuminating means placed in the device to illuminate the side of the rotating disc or discs which is viewed by the observer. In modifications of this particular embodiment, there are also provided means for adjusting the brightness of these illuminating lights in order to properly compensate for the brightness of the reflected light. In this way, the rotating shutter acts as a reference for the amount of allowable obscurity, wherein the obscurity is one which reflects light, i.e., white smoke, when viewed against a dark background, an effective comparison can be made as to the degree of light transmission or obscurity of the smoke being measured if the shutter also reflects light to the same extent as the smoke.

It is an object of the present invention to provide a device for the measurement of the density of smoke.

It is a further object of the present invention to provide a new and better device for the measurement of either black or white smoke.

It is yet another object of the present invention to provide a smoke measurement device which is capable of measuring the density of low density smoke, in particular, smoke having a density of Ringlemann 1 or less.

DESCRIPTION OF THE DRAWINGS

FIG. 1 illustrated the basic embodiment of the present invention generally designated by the numeral 9. A viewing tube 11 having an eye piece 12 is set in an enclosed casing 10. The tube 11 protrudes partway into casing 10 and a second tube 15 having a common axis is set in the front portion of casing 10 whereby there is provided a direct line of sight through tubes 11 and 15 and a space within container 10 between said tubes 11 and 15. In optional modification of the optical system the viewing tubes 11 and 15 may contain lens elements to convert said viewing tubes into a telescope.

Figure 1:
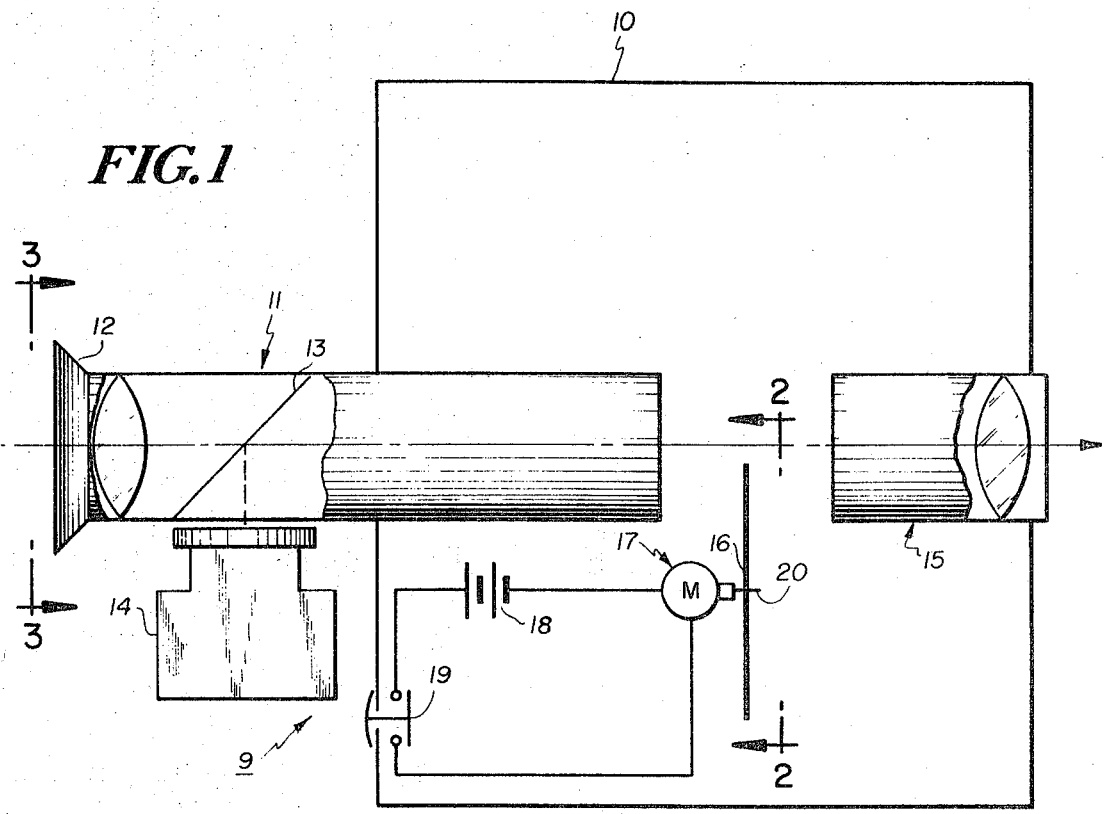
FIG. 1 is a cross sectional view of a device embodying the principles of the present invention.

An additional feature of the device 9 is the placement of a halfway mirror 13 set diagonally in tube 11 so that the view throught tube 15 may be photographed by camera 14.

Segmented disc 16 is mounted in a plane perpendicular to the axis of tubes 11 and 15 in such a manner that the edge of said disc 16 when rotated will describe an arc which approaches but does not cross the axis of viewing tubes 11 and 15. The area obscured by the disc is less than half of the field of view. The segmented disc 16 is mounted on an axis 20 which is connected to a rotating means such as motor 17. In the basic embodiment of the present invention rotating means 17 is a conventional electric motor energized by a battery 18 through a switch 19.

Figure 2:
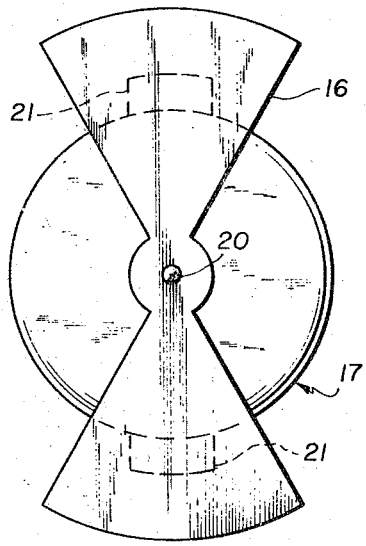
FIG. 2 is a front elevational view of the reference disc utilized in FIG. 1 viewed in the plane 2—2.

FIG. 2 shows a front elevational view of segmented disc 16. It has been found desirable to keep the solid portions of the segmented discs substantially out of the field of vision when the disc is not rotating. The disc is made of a magnetizable material. There are therefore mounted, suitably upon the housing of motor 17 a pair of magnets 21 which will hold the disc 16 in a substantially vertical position substantially out of the path of vision through tubes 11 and 15.

Figure 3:
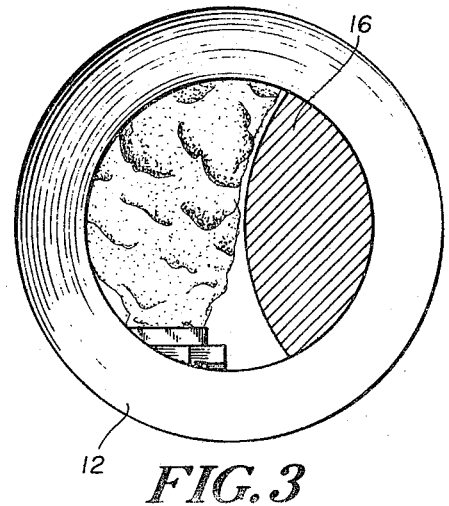
FIG. 3 is a rear elevational view of the field of view of the viewing tube of FIG. 1 taken in the plane 3—3.

In operating the device of the present invention the viewing tube of the device is directed at the smoke emitting source under examination and the discs 16 caused to rotate, suitably by closing the circuit at switch 19. The view observed through the viewing tube will be substantially similar to that shown in FIG. 3. It will be understood that the greater the solid portion of disc 16 the darker will be the area obscured thereby. It will therefore be readily seen that by varying the proportion of segmented disc removed therefrom, a shaded area may be presented which corresponds to smoke densities of all practical values on the Ringlemann scale. Thus, it has been found, although this is not to be considered a limiting factor, that Ringlemann densities of down to 0.25 corresponding to 5% obscuration may be measured. Thus by rotating a disc 16 of a predetermined degree of segmentation onto axis 20 and having the path of vision directed at the ambient adjacent a smoke emission source to be observed against a light background the density of said emissions source may be readily measured by comparing it to the darkness of the rotating disc portion of the field of vision. If darker, the smoke has a higher Ringlemann density than the predetermined disc Ringlemann factor.

Figure 6:
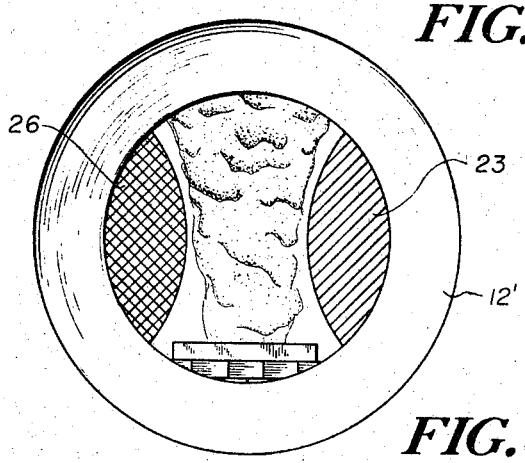
FIG. 6 is a rear elevational view of the field of view of viewing tube of FIG. 4 taken in the plane 6—6.

It will be seen that the use of merely one disc in the device is somewhat limiting as to the range of each individual observation. The range of this observation may be considerably increased however, by placing a second, similar, rotating disc on the other side of the axis of the viewing tube. Thus, it is possible to classify a smoke emission as, say, lighter than the left hand disc and darker than the right disc or lighter than both discs or having value darker than both discs. A typical view taken through such a tube is shown in FIG. 6.

Figure 4:
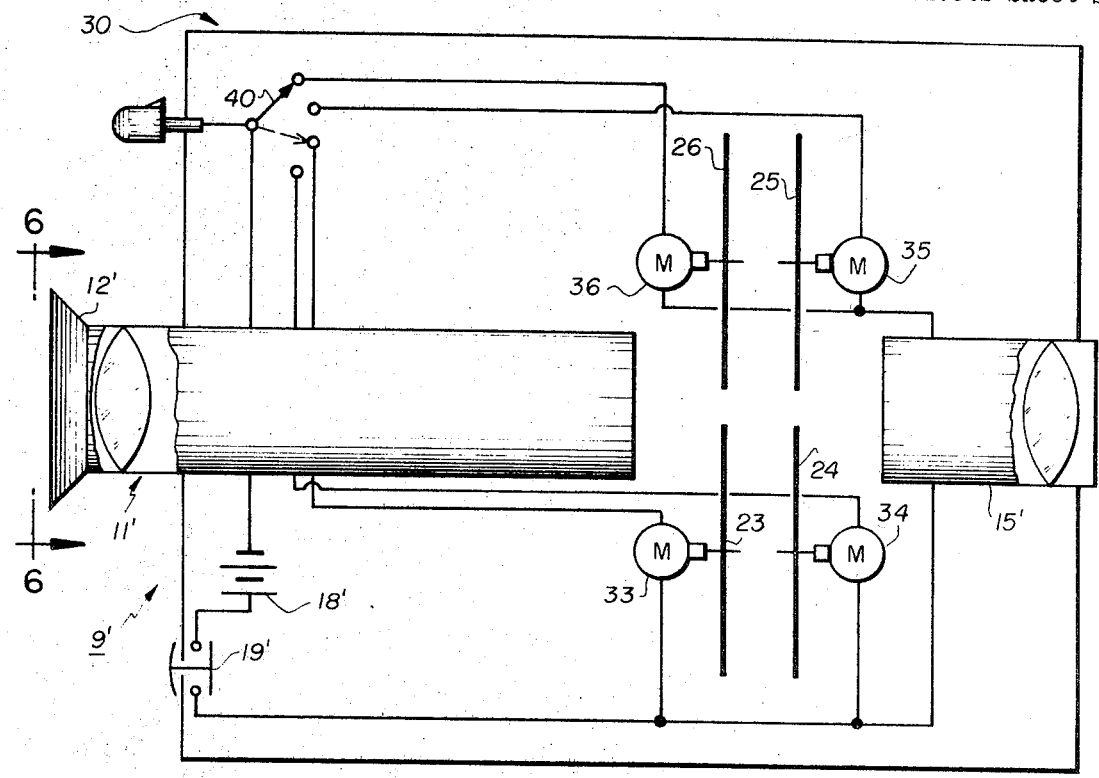
FIG. 4 is a cross sectional view of a second embodiment of the present invention showing the placement of four segmented discs and a schematic of the circuit for activating these discs.
Figure 5:
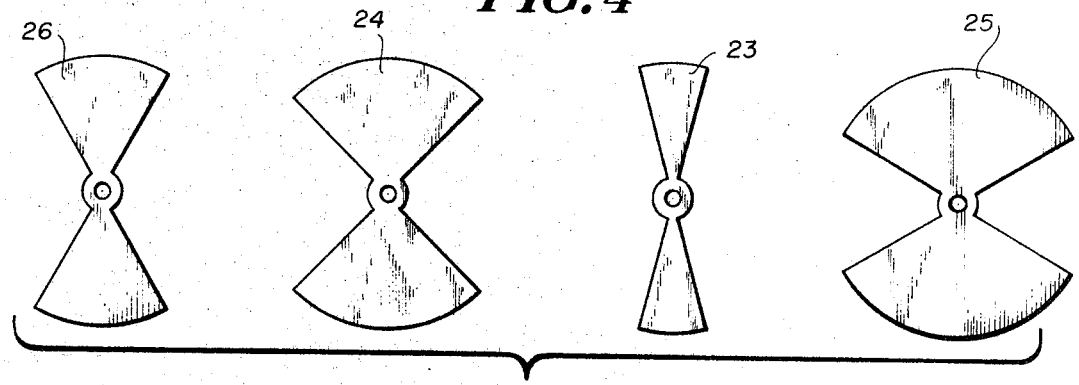
FIG. 5 shows a front elevational view of the discs of FIG. 4.

As stated hereinabove the device of the present invention is capable of modification of considerable degrees of sophistication. FIG. 4 illustrates one of these modifications. The basic principle of the device 9 is the same as that of the device illustrated in FIG. 1 and similar elements are indicated with prime numerals. There are placed in such a device four discs, 23, 24, 25, and 26, a front elevational view of which are seen in FIG. 5, it being understood however, that the degree of segmentation shown is to be considered as merely illustrative and not limiting. The discs 23, 24, 25, and 26 may be rotated about their axis by motors 33, 34, 35, and 36 respectively which are shown in FIG. 4 as energized by battery 18 thru switch 19 and switch 40 respectively.

Although not shown, it is desirable that all discs be fitted with the magnetic, or similar retaining devices as shown in FIG. 2 so that when a disc is not being observed, it is "parked" in such a manner as to obscure the smallest possible segment of the field of vision. It has been found desirable to provide a method of selectively rotating pairs of discs in the field of vision. Such coupling is illustrated in FIG. 4 wherein by suitable positioning of switch 40 there are rotated in the field of vision disc 23 and 26, discs 24 and 26, and discs 24 and 25, and discs 23 and 25 respectively. In the illustration shown in FIG. 5, disc 23 corresponds to 20% obscuration or Ringlemann 1, disc 26 corresponds to 40% obscuration or Ringlemann 2, disc 24 corresponds to 50% obscuration or Ringleman 2.5 and disc 25 corresponds to 60% obscuration or Ringlemann 3. It will thus be seen that by selective comparison of the shading presented by the rotation of these various discs a rather accurate measurement of the density of a particular smoke emission is possible. It is to be understood however, that the degrees of segmentation in the various discs of the device may vary more closely than those illustrated in this modification.

It will be seen from the description of the embodiments of the present invention set forth hereinabove that such embodiments would give rise to a measuring instrument of satisfactory optical properties, which however might be somewhat bulky. There are therefore available other embodiments of the present invention which may be utilized to construct a more compact instrument, where size is an important consideration.

Figure 7:
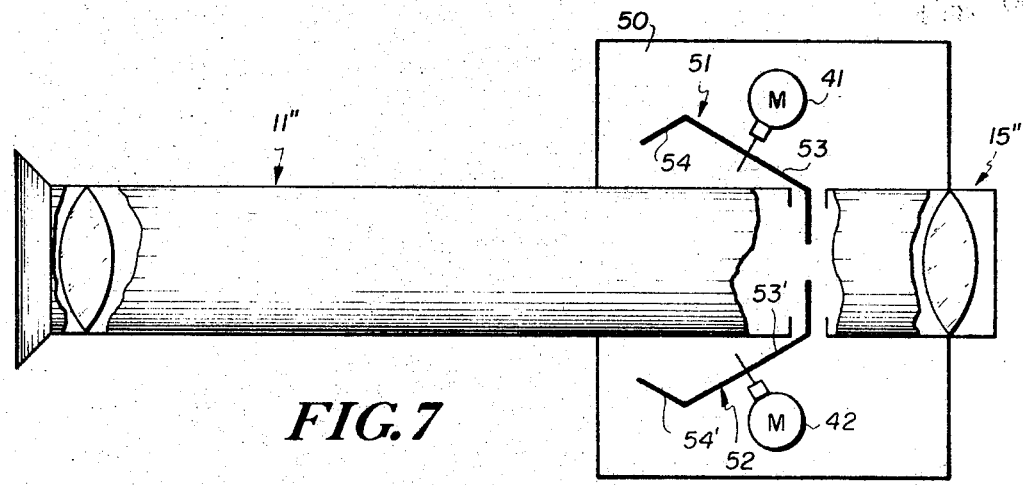
FIG. 7 is a cross sectional elevational view of a modification of the device of FIG. 1 showing two segmented discs disposed to provide a more compact instrument.
Figure 8:
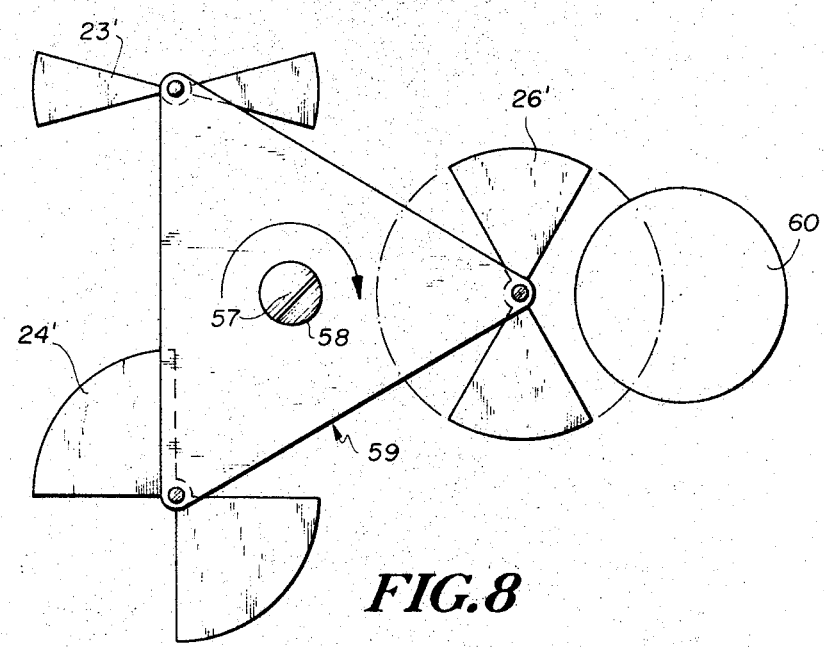
FIG. 8 shows a front elevational view of another modification of the present invention in which the discs may be sequentially positioned into the field of view.

One such embodiment is illustrated in FIG. 7, in this embodiment, in place of utilizing a circular disc as the shutter means, there are utilized truncated conical discs 51 and 52. These discs 51 and 52 consist of a central annular portion 53 and 53' conical section portions shown as 54 and 54', and wherein certain conical section portions are excised in order to give the desired proportions of transmission or obscuration as previously. The plane of annular portions 53 and 53' of discs 51 and 52 is set at an angle to the axis of viewing tubes 11″ and 15″ as shown in FIG. 7. The discs are caused to rotate by conventional rotating means 41 and 42 which are preferably electric motors. The angle at which the annular portions 53 and 53' are disposed to the axis of the viewing tubes is set in such a manner that the segments 54 and 54' rotate in a plane substantially perpendicular to the axis of viewing tubes 11″ and 15″ as illustrated in FIG. 7. Another method presenting a large number of discs of different degrees of segmentation into the viewing field is shown in FIG. 8. Segmented discs 23', 24' and 26' are mounted in a solid triangular carrier 59 which is rotatably mounted about axis 57. The segmented discs 24', 23' and 26' may have common or separate means of rotation and all rotate in a plane parallel to the plane of mounting unit 59. By turning control knob 58 each of the segmented discs is in turn presented into viewing field 60.

Figures 9, 10:
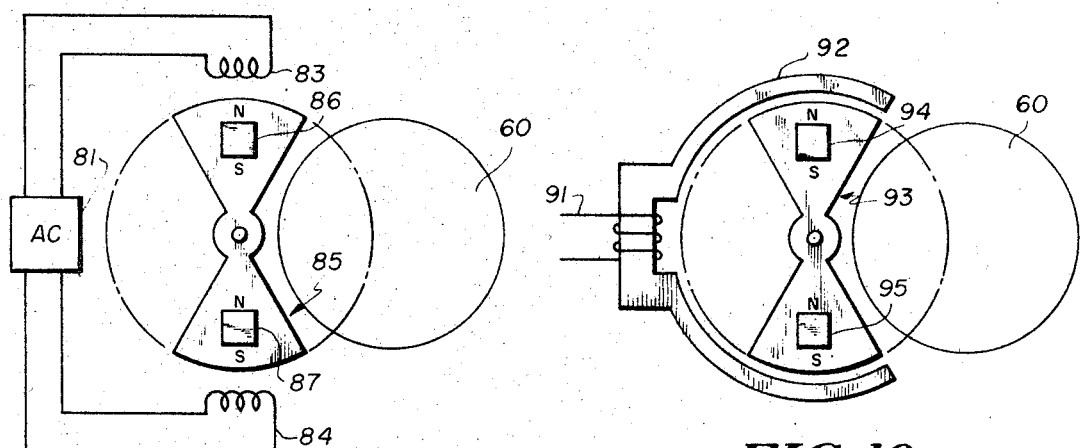
FIG. 9 illustrates a front elevational view of a segmented disc utilized in the present invention together with a diagrammatic representation of an alternating current rotating means therefor.
FIG. 10 illustrates a front elevational view of a modification of the embodiment of FIG. 9.

In yet another modification of the embodiments of the present invention, the segmented blades themselves could serve as the armature of an electric motor. Thus, the segments themselves could be magnetized or small magnets attached to the rear, or non-viewed side of the segments as shown in FIGS. 9 and 10. In the modification of FIG. 10 the direct current of the battery is converted into alternating current by an alternating device 81 and caused to pass through field coils 83 and 84 disposed relative to disc 85 in the manner shown.

The disc 85 acts as the armature of A-C motor. When it is desired to "park" one particular disc utilizing this modification, the alternating device 81 is switched off and direct current flows through field coils 83 and 84, thus, holding disc 85 in the desired vertical position.

FIG. 10 illustrates an alternative to the modification of FIG. 9 wherein, in place of a pair of field coils a single coil 91 is wound about a portion of a substantially C-shaped magnetic or magnetizable core 92 disposed about segmented disc 93. Disc 93 may be either magnetized or have set therein magnets 94 and 95. In a similar manner, upon application of an alternating current thru coil 91 segmented disc 93 will rotate and upon application of a direct current thru coil 91 the segmented disc 93 will be parked.

It will be readily seen that utilizing the modifications of FIGS. 7 and 10 there results a very great saving of space. It is therefore possible, using this modification, to place, say, three discs of different degrees of segmentation on each side of the viewing field 60 and still retain a substantially compact instrument.

From the point of view of practical application it would be anticipated that four discs would provide a sufficient number of different shades to cover the desired portion of the Ringlemann scale in sufficient detail.

In discussing all of the modifications of the present invention illustrated hereinabove, discussion has been principally directed at the measurement of the density of black smoke. As stated hereinabove the present invention and all of its modifications are equally applicable for the measurement of the density of white smoke.

When utilized for this purpose the instrument is provided with illuminating means preferably a source of white light which illuminates the viewed side of the segmented discs. The viewed side of the sector discs might be coated with a reflective tape to enhance this reflection. These illuminating means are suitably run off the same power source as utilized for powering the rotating means for the discs, although the scope of the invention should not be considered as so limited. In a desired modification of this embodiment, the illuminating means are connected to a dimming device. The purpose of this dimming device is to adjust the degree of illumination of the solid portion of the segmented disc, in order to compensate for reflected light.

Figure 11:
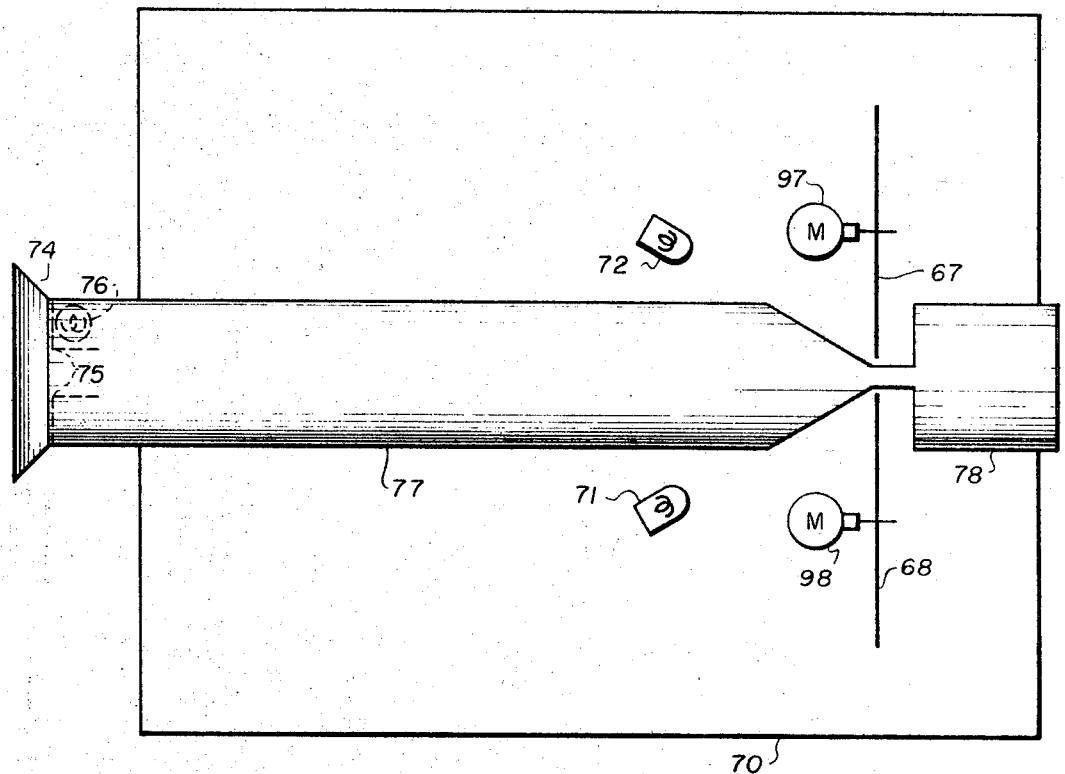
FIG. 11 illustrates a side elevational cross sectional view of a modification of the present invention for use in measuring white smoke, showing two possible modes of disposing the illuminating devices threeof.

FIG. 11 illustrates in diagrammatic form a simple modification of the illuminated embodiment of the present invention. It is to be understood however, that this manner of the illumination may be applied to any of the more complex modifications of the present invention discussed hereinabove.

In FIG. 11 rotating discs 67 and 68 having reflective coating on the viewed side thereof are placed between portions 77 and 78 of the viewing tube and connected to driving means 97 and 98 respectively in a similar manner to that illustrated in FIG. 1. Illuminating means preferably white light sources 71 and 72 are placed rearwardly of discs 67 and 68 approximately in the location illustrated in such a manner that illuminating means 71 illuminates disc 68 and illuminating means 72 illuminates disc 67, without the light from either illuminating means being directly viewable through eye piece 74.

In another modification of the present invention as shown in dotted line in FIG. 11, there may be utilized a single illuminating means 76 placed with tube 77 in this modification. However there must be inserted into tube 77 at eye piece 74 a blocking means 75 whereby the observer may look into the main body of tube 77 and observe the rotating discs 67 and 68 without directly observing illuminating means 76.

For reasons of simplicity the electrical circuitry of embodiment of FIG. 11 is not shown. Thus FIG. 11 does not show the battery means for powering the rotating means 97 and 98 or the illuminating means 71, 72, or 76. The embodiment of FIG. 11 includes a dimmer (not shown) which is placed in the illumination circuit in order to adjust the strength of illumination.

It should be understood that all of the embodiments of the present invention may be modified by adding certain components. For example, it may be found desirable to insert filters into the viewing system in order to reduce glare in observing certain smoke emissions. It will be clearly seen that such filters would block both the background of the emission and the emission itself equally. The measurement of the Ringlemann value of the smoke emission would not be affected thereby. Furthermore, in another adaptation of the embodiments of the present invention the viewing tube may be in the form of a telescope for viewing distant emissions. In such a telescopic system, it is found desirable to place the rotating segmented discs near the eye piece end of the viewing tube rather than at the other end thereof.

Although this invention has been described with respect to its preferred embodiments, it should be understood that many variations and modifications will now be obvious to those skilled in the art, and it is preferred, therefore, that the scope of the invention be limited, not by the specific disclosure herein, only by the appended claims.

What is claimed is:

1. A device for determining the density of smoke emission which comprises:
    (a) optical sighting means,
    (b) at least one shutter means, said shutter means being disposed to sequentially block light transmission in only a portion of the field of view of said optical sighting means,
    whereby by observation of the appearance of the smoke relative to the ambient background as seen through said shutter means, a measure of the density of said smoke emission may be obtained.

2. A device according to claim 1, additionally comprising means for illuminating the observed side of said shutter means,
    whereby the density of white smoke may be measured by comparing the density of the white smoke with the density of the ambient background as seen through the illuminated shutter.

3. A device according to claim 2 additionally comprising means for adjusting the intensity of said illuminating means.

4. A device according to claim 2 wherein the illuminating means comprising one or more illuminating units placed within the device in such a manner that the illumination therefrom is reflected by the shutter means is visible through the sighting means, while the illuminating means itself is invisible through said sighting means.

5. A device according to claim 1 wherein said shutter means comprises a rotating disc having segments thereof removed.

6. A device according to claim 5 wherein said rotation means comprises electric motor, an electrical power source, and switching means for actuating said motor.

7. A device according to claim 5 comprising at least one pair of segmented discs disposed in the field of vision of the optical sighting means in such a manner that the arc described by the outermost edge of either of said discs at all times fails to intersect with the arc described by the other member of said pair.

8. A device according to claim 5 wherein said shutter means comprises a plurality of pairs of rotating segmented discs and
    means for presenting only one pair of rotating discs into the field of vision of said optical sighting means at any one time.

9. A device of claim 1 wherein said optical sighting means comprises a plurality of tubes having a common longitudinal axis, said shutter means being dispsoed between said takes.

10. A device according to claim 5 including means for holding the shutter means substantially out of the field of vision of said optical sighting means whereby said shutter can be stopped in a position in which it will not block light transmission in said optical sighting means.

11. A device according to claim 10 wherein said segmented disc includes ferric elements and said holding means includes magnetic means for holding said discs when stationary in a predetermined position.

12. A device according to claim 11 wherein said magnetic means are permanent magnets.

13. A device according to claim 5 wherein said rotating discs are magnetizable and magnetic field means for creating an alternating magnetic field having its principal axis substantially in the plane of said discs and substantially perpendicular to the axis of rotation of said discs, whereby said last-mentioned means will cause rotation of said discs.

14. A device according to claim 13 including a source of alternating current to supply said last-mentioned means, said source including
   source of direct current,
   means for converting direct current to alternating current electrically connected to said source of direct current, and
   means for maintaining only a direct current in said source circuit,
   whereby upon cessation of the flow of alternating current through said source circuit, the remaining direct current flow maintains a constant magnetic field thereby holding the disc in a predetermined position.

15. A device according to claim 14 wherein said magnetic field means comprises field coils placed in the plane of rotation of the disc substantially perpendicular to the axis of rotation thereof.

16. A device according to claim 14 wherein said magnetic field means comprises a substantially C-shaped magnetic core placed substantially circumferentially about the path of rotation of the disc.

17. A device according to claim 5 wherein said shutter means includes means for mounting a plurality of discs about a common axis, said common axis being parallel to the axis of rotation of said discs, said mounting means being positioned in the device in such a manner that by rotating said means about said common axis said discs are successively presented into the field of view of said optical sighting means.

18. A device according to claim 5 wherein said shutter means includes a truncated sectored conical disc means for rotating said discs about its axis of rotation, positioned in a manner whereby the ends of said conical disc are presented into the field of view of said optical sighting means in such a manner that said ends of said conical disc are substantially perpendicular to the longitudinal axis of said optical sighting means.

References Cited
UNITED STATES PATENTS

| | | | |
|---|---|---|---|
| 2,699,086 | 1/1955 | Finch | 356—207 |
| 2,921,497 | 1/1960 | Yant et al. | 356—207 |

RONALD L. WIBERT, Primary Examiner

O. B. PHEW II, Assistant Examiner

U.S. Cl. X.R.

356—207